United States Patent
Masino et al.

[11] Patent Number: 6,102,152
[45] Date of Patent: Aug. 15, 2000

[54] DIPOLE/MONOPOLE ACOUSTIC TRANSMITTER, METHODS FOR MAKING AND USING SAME IN DOWN HOLE TOOLS

[75] Inventors: James E. Masino, Houston; Batakrishna Mandal, Missouri City; James R. Birchak, Spring; John W. Minear, Houston; Thomas E. Ritter, Katy, all of Tex.

[73] Assignee: Halliburton Energy Services, Inc., Houston, Tex.

[21] Appl. No.: 09/335,988

[22] Filed: Jun. 18, 1999

[51] Int. Cl.[7] ........................ G01V 1/40
[52] U.S. Cl. ................ 181/106; 310/334
[58] Field of Search .................. 181/105, 106, 181/102; 367/159; 310/334, 369

[56] References Cited

U.S. PATENT DOCUMENTS

5,043,952  8/1991  Hoyle et al. ............. 181/106

*Primary Examiner*—Khanh Dang
*Attorney, Agent, or Firm*—J. M. Mark Gilbreth; Gilbreth & Associates

[57] ABSTRACT

A sonic or acoustic tool is disclosed which includes a transmitter with reduced transmitter spawned noise. The transmitters are either monopole or dipole depending on the orientation of ports in a chamber divided by a piston driven by an actuator. The transmitter size is limited only by the diameter of the tools itself because the transmitters are oriented within the tool parallel to the axis of the tool.

22 Claims, 8 Drawing Sheets

DIPOLE/MONOPOLE ACOUSTIC TRANSMITTER, METHODS FOR MAKING AND USING SAME IN DOWN HOLE TOOLS

BACKGROUND OF THE INVENTION

1. Field of the Invention

In one aspect, the present invention relates to apparatus and methods for subterranean exploration, and to methods of making said apparatus. In another aspect, the present invention relates to sonic or acoustic apparatus and methods for use in well logging operations, and to methods of making said apparatus. In even another aspect, the present invention relates to sonic or acoustic tools and methods including a dipole or monopole acoustic transmitter having broad band frequency characteristics with reduced tool noise for use in oil well logging applications, and to methods of making said tools. In still another aspect, the present invention relates to acoustic down hole tools and methods including a dipole or monopole acoustic transmitter having reduced tool mode noise spawned by the transmitter where the transmitters use an actuator driven piston to create pressure into and out of anti-symmetrically or symmetrically disposed openings in a fluid filled housing, and to methods of making said tools.

2. Description of the Related Art

Sonic or acoustic tools are well known for use in oil well logging applications. Such tools employ both a dipole and monopole transmitter to generate waves used to gather data about the subterranean.

Most dipole and monopole transmitters operate in a pulse mode. Energy is usually stored in a capacitor and when transferred to the transmitter produces an acoustic pulse. Generally, an acoustic pulse shape is largely controlled by physical constants such as component mass, spring constants and transmission path lengths making the pulse shape hard to predict and difficult to control or modify.

Dipole acoustic tools generate and measure flexural waves at the borehole wall. At low frequencies, the flexural wave travels at the same velocity as the shear wave. At higher frequencies, the flexural wave travels at a slower velocity than the shear wave. The time delay or slowness ($\Delta t$) of the flexural wave relative to the shear wave can be computed once the acoustic response is received by a receiver. However, the $\Delta t$ computation is difficult due to acoustic waves traveling through the tool sonde, commonly known as tool mode noise. Occasionally, this noise is superimposed upon the flexural wave. When this occurs, it is difficult to filter out the noise or to identify the flexural response.

Unfortunately, the dipole transmitter itself is responsible for generating a majority of the tool mode noise. Sources of this tool noise are transmitters that rely heavily upon their mass to control the pulse shape. For example, commonly utilized transmitters have undesirably high transmitter caused ("spawned") noise that interferes with low frequency flexural waves and subsequent detection of the shear wave.

Of course, transmitters having poor electrical to acoustic efficiency require a large bulky power supply and drive circuitry. With these transmitters, the power supply can account for much of the tool's length. As would be expected, a small diameter acoustic transmitter having high output, high signal-to-noise ratio and the ability to operate in pulse or continuous mode is not available.

Therefore, there is a need in the art for improved well logging methods and sonic tools.

There is another need in the art for sonic methods and tools using an effective dipole or monopole acoustic transmitter for use in oil well logging applications.

There is even another need in the art for sonic methods and tools featuring any of reduced manufacturing costs, rugged construction for hostile environments, or simplified signal processing capabilities, and reduced tool mode noise spawned by the transmitter.

There is still another need in the art for sonic methods and tools having electronically controlled or tuned dipole and monopole transmitters which enhance any of processing, pulse shape or the spectral content.

There is yet another need in the art for sonic methods and tools having dipole and monopole acoustic transmitters with controllable low frequency cutoff values.

These and other needs in the art will become apparent to those of skill in the art upon review of this specification and drawings.

SUMMARY OF THE INVENTION

It is an object of the present invention to provide for improved well logging methods and sonic tools.

It is another object of the present invention to provide for sonic methods and tools using an effective dipole or monopole acoustic transmitter for use in oil well logging applications.

It is even another object of the present invention to provide for sonic methods and tools featuring any of reduced manufacturing costs, rugged construction for hostile environments, or simplified signal processing capabilities, and reduced tool mode noise spawned by the transmitter.

It is still another object of the present invention to provide for sonic methods and tools having electronically controlled or tuned dipole and monopole transmitters which enhance any of processing, pulse shape or the spectral content.

It is yet another object of the present invention to provide for sonic methods and tools having dipole and monopole acoustic transmitters with controllable low frequency cutoff values.

These and other objects of the present invention will become apparent to those of skill in the art upon review of this specification and drawings.

According to one embodiment of the present invention, there is provided a transmitter including a housing and at least one actuator each contained in a fluid filled, pressure balanced actuator chamber within the housing. The transmitter also includes a drive rod extending from the actuator to a piston positioned within a fluid filled, piston chamber where the piston divides the piston chamber substantially in half when in a neutral state and is designed to slidingly engage an interior surface of the piston chamber. The piston chamber includes at least one aperture, window or opening in each portion of the chamber divided by the piston. When the openings are oppositely disposed on the transmitter (anti-symmetric), then the transmitter produces a dipolar excitation; while when the openings are disposed symmetrical with respect to the piston, then the transmitter is a monopole transmitter.

The present invention also provides a transmitter including a housing and a plurality of actuators each contained in an actuator chamber and where pistons attached to drive rods extending from each actuator are symmetrically disposed within a piston chamber having at least one port, aperture, window or opening.

The present invention further provides a sonic tool including a transmitter of the present invention and a receiver, a plurality of spaced apart receivers located along a length of the tool, or a plurality of transmitters at least one of which is the transmitter of the present invention and a plurality of spaced apart receivers located along a length of the tool.

The present invention still further provides a method for generating an acoustic signal with reduced tool noise using a sonic tool having a transmitter of the present invention and methods for making a transmitter of the present invention and a tool incorporating a transmitter of the present invention.

BRIEF DESCRIPTION OF THE DRAWINGS

The aspects of the present invention will be set forth in greater detail herein and, in particular, by reference to the illustrative figures described below where like elements have common labels.

DETAILED DESCRIPTION OF THE INVENTION

Sonic or acoustic tools of the present invention for down hole use includes a new transmitter which reduces tool spawned noise, increases frequency band width, maximizes obtainable output pressure throughout a given band width, makes the band width tunable, makes low frequence cut off controllable and/or lowers the cost of transmitter and tool design and manufacture.

The sonic tool of the present invention utilizes a piston transmitter in which the piston motion is parallel, preferably co-axial, to the long axis of the tool. An enclosure, around the piston, provides ports through which acoustic energy is emitted from the transmitter housing, with emission of acoustic energy being in a radial direction, that is, transverse to the long axis, where the emission may be in the same or different radical planes.

For the dipole embodiment, where the ports are on opposite sides of the tool, too large of a separation between ports radial planes will result in too much compression wave generation. Thus, the separation should be less than ¼th wavelength, preferably less than ⅛th wavelength, and more preferably less than ¹⁄₁₀th.

For the monopole embodiment, where the piston ports are on the same sides of the tool, too long of a separation can cause two separate compressional waves to be generated. Thus, the separation should be less than ¼th wavelength, preferably less than ⅛th wavelength, and more preferably less than ¹⁄₁₀th.

The acoustic sources or transmitters of the present invention may be used for one or more of the following types of measurements: dipole, cross dipole, monopole and formation ahead of bit. They may also be used for acoustic data communication through the fluid region of a borehole including but not limited to communication around the mud motor for LWD applications. The improved transmitter of this invention provides lower frequencies with less tool mode noise for use in open hole shear wave measurements, cased hole formation evaluations, LWD bed boundary evaluations and LWD formation ahead of bit evaluations.

An actuator is used to move a lightweight piston that generates an acoustic wave. The preferred actuators are Terfenol-D actuators available from ETREMA Products, Inc. An enclosure, around the piston, provides ports through which the acoustic energy is emitted from the transmitter housing. An acoustically transparent device, such as a rubber boot, may cover the ports in order to prevent debris from entering the piston chamber. The transmitter type (monopole/dipole) is determined by orientation and number of these ports.

The transmitters of this invention produce minimal tool mode noise and their output pressure is equal to or greater than existing transmitters. The diameter of dipole transmitters of the present invention can be made equal to or smaller than other dipole transmitters. The transmitters of this invention can operate in either pulse or continuous sweep frequency mode. When operating in pulse mode, the pulse shape of pulses generated by the transmitters of the present invention can be altered. The bandwidth and pressure output of the transmitters of this invention are controllable and may be altered by piston characteristic and actuator parameters. Therefore, the actuator's size may be altered as power requirements dictate. In a preferred embodiment, the transmitters are driven by a high power audio-band amplifier. Preferably, the transmitter is very rugged and ideally suited for hostile environments.

The transmitters of the present invention include a housing, an actuator contained in a fluid filled, preferably a dielectric fluid filled, pressure balanced, actuator chamber and a drive rod extending from the actuator through the actuator chamber and connecting at its distal end to a piston contained in a fluid filled piston chamber. Additionally, the drive rod may be made hollow and extended through the second piston chamber, which would allow a passage for through wires. The transmitter further includes at least one opening or aperture in the piston chamber. As the actuator drives the piston in a reciprocating fashion at a given frequency, the resulting pressure wave, acoustic signals, travel out of the piston chamber through the openings in the piston chamber. When the transmitter is part of down-hole tool, the acoustic signal generated by the transmitter is directed toward the well bore wall. Waves are then received by receivers in the tool and the data are analyzed by a data processing unit to obtain acoustic information about the given location in the well bore.

Figure 3:
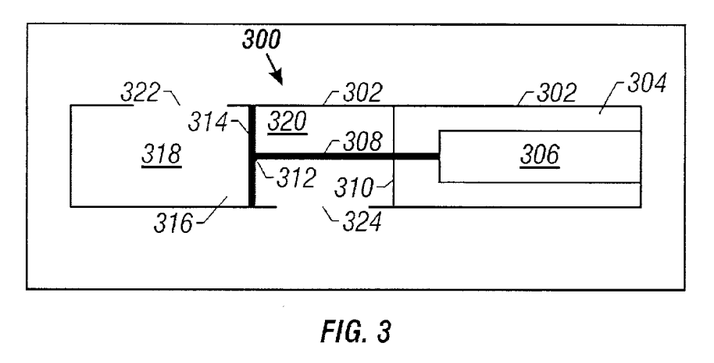
FIG. 3 is a cross-sectional view through a first embodiment of a dipole transmitter 300 of this invention.
Figure 4:
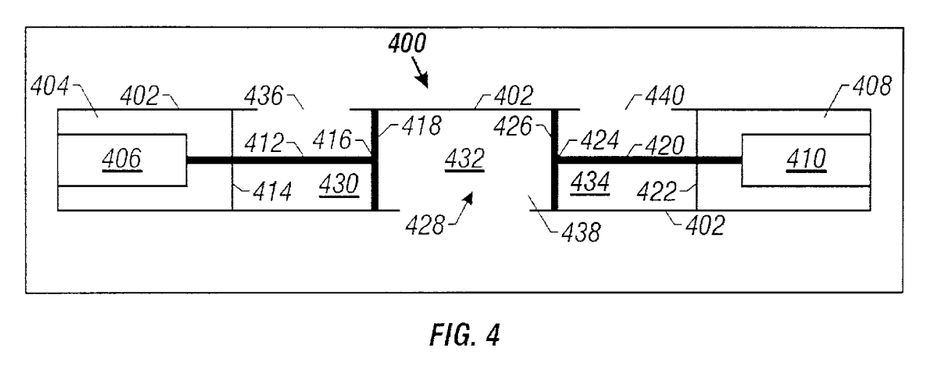
FIG. 4 is a cross-sectional view through a second embodiment of a dipole transmitter 400 of the present invention.

The transmitters of the present invention can be dipole transmitters or monopole transmitters depending on the orientation of the openings in the piston chamber. The piston is designed to divide the piston chamber substantially into two equal volumes when the piston is at rest in a mid point condition, where the mid point condition occurs when the drive rod is extended about halfway from its most retracted point to its most extended point. If one opening is placed in each half of the piston chamber and oriented anti-symmetric (i.e., located opposite one another as shown in FIGS. 3–4, then the transmitter generates a dipole acoustic signal. As the piston reciprocates, an alternating pressure wave is emitted from the openings and because the openings are anti-symmetric, the signal is dipolar in nature.

Figure 5:
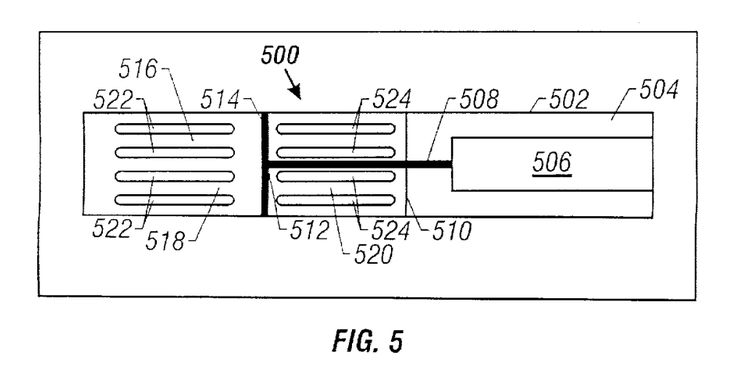
FIG. 5 is a cross-sectional view through a first embodiment of a monopole transmitter 500 of the present invention.

On the other hand, if openings are arranged mostly symmetrically on each side of the piston and around its circumference as depicted in FIG. 5, then the signal produced is monopolar in nature.

The actuator is attached by a drive rod to a piston and both are enclosed in a protective tool housing. The tool housing is filled with a fluid, preferably dielectric oil, and pressured balanced. The piston and the drive rod are made as light-weight and rigid as possible. The housing is divided into two nearly equal volumes by the piston. The piston and interior can be of any shape provided that the piston can move smoothly through its entire range of motion. Preferably, the piston and interior is cylindrical in form similar to pistons and cylinders in an internal combustion engine. The piston moves about a cylinder mid point in the direction of a cylinder length. For a single actuator dipole transmitter of the present invention, there will be two ports (openings) in the housing, one on each side of the piston. Although the ports can have any cross-sectional area, preferably, the ports will have a cross-sectional area substantially equal to a cross sectional area of the piston. When the port and piston cross-sectional areas are nearly the same, within 10% of each other, there is little restriction to fluid motion. When the port cross-sectional area becomes smaller than the piston cross-sectional area by greater than about 10%, the discharge of the acoustic wave out of the port may be restricted producing a back-pressure to piston motion and interfering with signal integrity.

Again, for dipole transmitters, the ports are oriented 180 degrees apart, i.e., the ports are in an anti-symmetric configuration. As the piston moves back and forth (reciprocates) about the cylinder mid point along a cylinder axis, the two volumes alternately increase and decrease. This volume change, creates a corresponding pressure change that is 180 degree out of phase or has a 180 degree phase shift between the ports, resulting in a dipole pressure wave. Since the actuator is mounted parallel to a tool axis, the length of the actuator is not limited by a tool diameter.

For proper operation, the piston radius can be approximated by Equation 1:

$$r = \frac{1}{\pi}\sqrt{\frac{F}{fd\sqrt{\rho B}}}$$

where r is the radius, F is the force (actuator static peak force), f is the low frequency cutoff, d is the displacement (peak-to-peak), ρ is the density of the fluid and B is the bulk modules of the fluid.

Suitable materials out of which the piston and drive rod may be constructed include, without limitation, any suitable metal, thermoplastic, thermoset or composite material, non-limiting examples of which include steel, aluminum, tungsten, titanium or a combination thereof. Aluminum, for example, reduces the piston's weight while steel minimizes the shaft's elongation when driven.

Suitable fluids for use in the actuator chamber of the present invention include, without limitation, organic and inorganic fluids such as natural or synthetic oils, mineral oils, motor oils, silicones fluids, non-two phase mixtures or combinations thereof, or the like. Silicon oils are preferred. In addition, typical borehole fluids may be utilized in the sub chambers. Less preferred signal transmission media include, without limitation, gases such as air, nitrogen, argon, neon, helium, or mixtures thereof.

Figure 1:
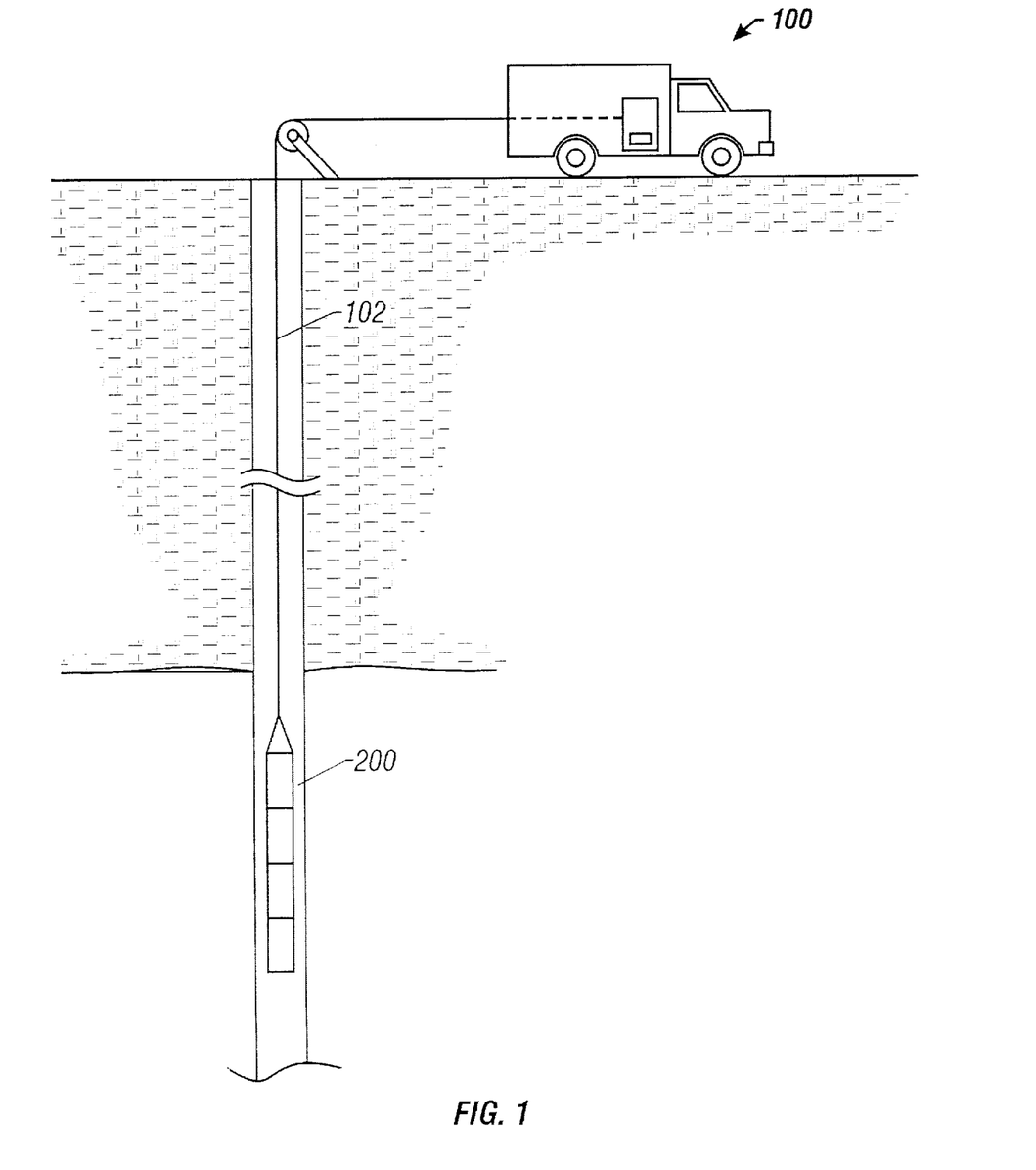
FIG. 1 is a schematic illustration of a wireline truck 100 and a drill string 102 with a down-hole acoustic logging tool 200 of the present invention.

Referring now to FIG. 1, there is shown a general illustration of a wireline truck 100 and a drill string 102 with a down-hole acoustic or sonic tool 200 of the present invention.

Figure 2:
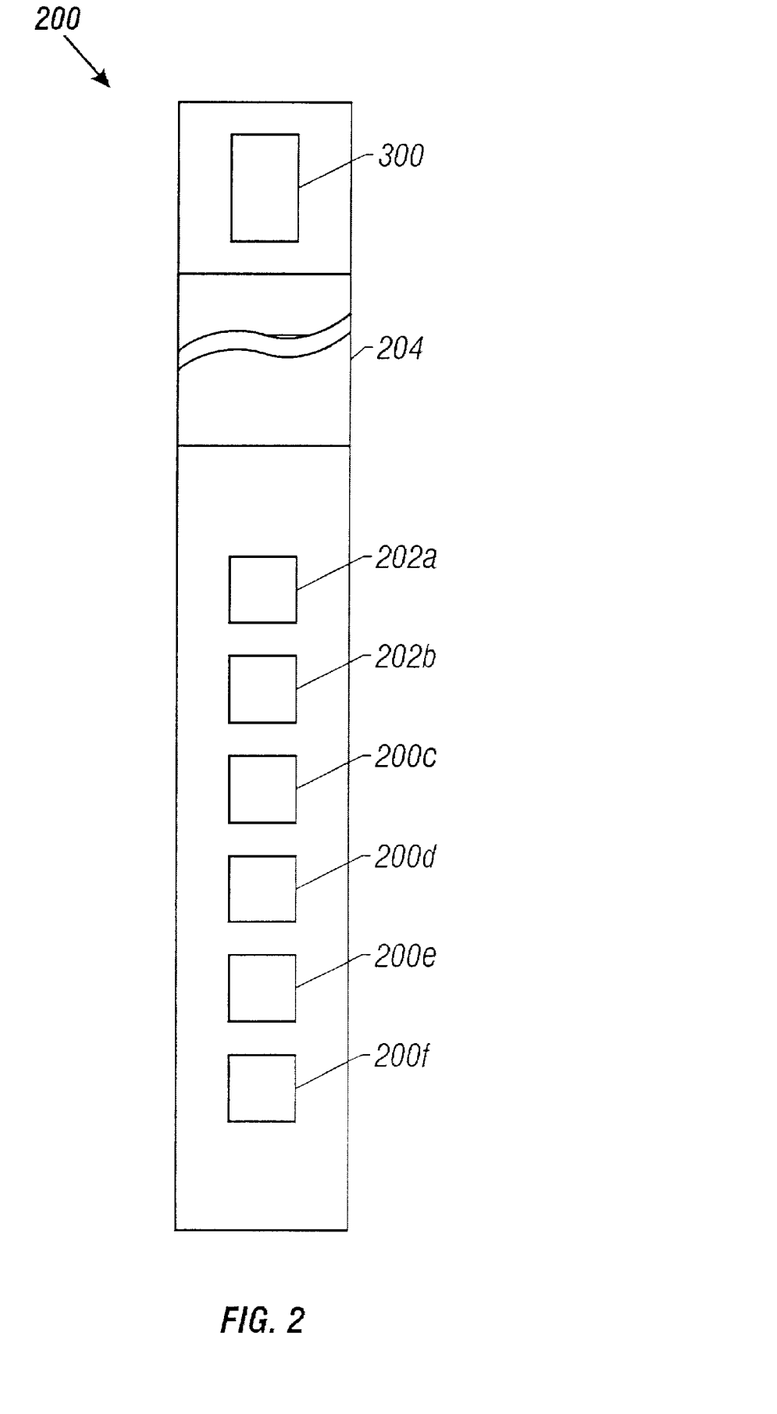
FIG. 2 is a front view of the sonic tool 200 of the present invention showing a transmitter 300, receivers 202a–f and isolator 204.

Referring additionally to FIG. 2, there is shown one embodiment of sonic well tool 200 of the present invention, showing a transmitter 300, isolator 204 and receivers 202a–f. As shown in the figures, tool 200 includes not one receiver, but a plurality of receivers 202a–f. Although the tool 200 is shown with six receivers, the tools of the present invention can incorporate from 1 to any number of receivers limited only by available space on the tool and the size of the receivers. Ideally, when multiple receivers are used a distance between the receivers is set to a given distance or set of distances. When multiple receivers are incorporated into the tool, each receive can have associated therewith its own calibration unit or the calibration device can consist of one centralized calibration device in acoustic communication with each receiver. In addition, the receiver array need not be in the borehole, but could be on the surface or in another well.

Referring additionally to FIG. 3, a first embodiment of a dipolar transmitter of this invention, generally a transmitter 300 includes a housing 302, which contains an actuator chamber 304 having an actuator 306 therein. Actuator 306 includes a drive rod 308 extending from the actuator 306 through an actuator chamber wall 310 and connected at its distal end 312 to a piston 314. Piston 314 is positioned in a piston chamber 316 so that when the piston is at mid-point of its stroke, the piston chamber 316 is divided approximately into two equal sub-chamber 318 and 320. The sub-chamber 318 includes a first port 322; while the sub-chamber 320 includes a second port 324. The ports 322 and 324 are oriented so that they are in anti-symmetric relationship with each other or stated differently, the ports are located opposite each other. Thus, if the piston chamber has a square or rectangle cross-section, then one port would be located in a top wall of the housing and the other port would be located in a bottom wall of the housing. Similarly, if the piston chamber is cylindrical, then one port will be located 180 degrees around the cylinder's exterior surface from the other port. This anti-symmetric configuration of ports causes a dipolar pressure wave to be produced when the drive rod controlled by the actuator moves the piston up and down in the piston chamber.

Figure 13:
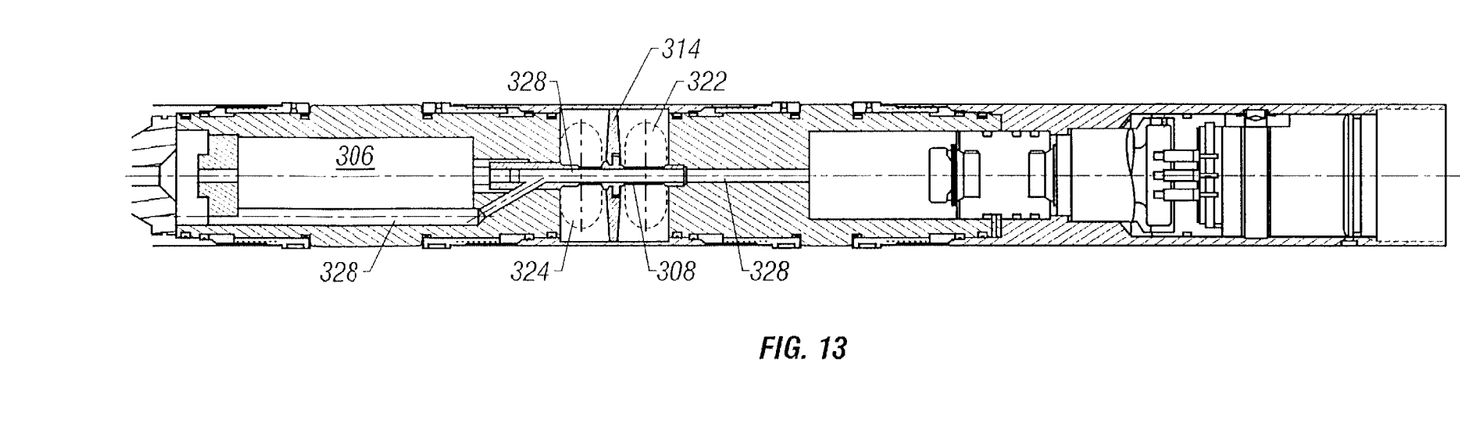
FIG. 13 is a cross-sectional view of a dipole transmitter 300 of the present invention illustrating passageway 328 for through wires.

Referring additionally to FIG. 13, there is shown a schematic of transmitter 300 of the present invention having piston 314, drive rod 308, actuator 306, first port 322, second port 324 and optional passage way 328. Passage way 328 extends through drive rod 308 and allows a passage for wires through the transmitters of the present invention. It is understood that any of the embodiments of the present invention may include optional wire passage way 328.

Referring additionally to FIG. 4, a second embodiment of a dipolar transmitter of this invention, generally a transmitter 400 includes a housing 402, which contains a first actuator chamber 404 having a first actuator 406 therein and a second actuator chamber 408 having a second actuator 410 therein. First actuator 406 includes a first drive rod 412 extending from the first actuator 406 through a first actuator chamber wall 414 and connected at its distal end 416 to a first piston 418. Second actuator 410 includes a second drive rod 420 extending from the second actuator 410 through a second actuator chamber wall 422 and connected at its distal end 424 to a second piston 426. Pistons 418 and 426 are positioned in a piston chamber 428 so that when the pistons are a mid-point of their strokes, the piston chamber 428 is divided into three sub-chamber 430, 432 and 434. Chamber 430 and 434 are preferably equal in volume and M that of chamber 432. Also, ports 436 and 440 are preferably equal in area and ½ that of port 438. Left sub-chamber 430 includes a left port 436; the middle sub-chamber 432 includes a middle port 438; and the right sub-chamber 434 includes a right port 440. Left port 436 and right port 440 are oriented so that they are on the same side of housing 402 or in a symmetric relationship with each other; while the middle port 438 is oriented anti-symmetric to the other two port or stated differently, the middle port is located opposite the other two ports. Actuators 406 and 410 are operated simultaneously in opposing directions. Stated in other words, ports 436 and 440 emit a pressure pulse that is generally equal and opposite that of port 438. Again, this anti-symmetric relationship between the ports causes a dipolar pressure wave to be produced when the drive rods controlled by the actuators move the pistons in the piston chamber.

In operation of transmitters 300 and 400, the transmitter is combined with an array of dipole receivers in order to measure the shear-wave velocity. Electronic circuitry in the tool, controlled by the operator, determines the pulse shape and rate of the transmitted pulses. This pulse induces a flexural wave in the borehole. Due to formation characteristics, there is a critical frequency, below 1 kHz, at which flexural waves in the borehole travel at the same velocity as the shear-wave in the formation. In order to enhance the shear-wave, the operator may adjust the spectral content of the transmitted pulse. When operated in a borehole, signals received by the receiver array are collected and transmitted uphole. The received signals are then processed to determine shear-wave velocity in the surrounding formation. As the tool moves through the length of the borehole, a log of shear-wave velocities versus depth is formed.

Referring additionally to FIG. 5, there is shown a first embodiment of a monopolar transmitter of this invention, generally a transmitter 500 includes a housing 502, containing an actuator chamber 504 having an actuator 506 therein. Actuator 506 includes a drive rod 508 extending from actuator 506 through an actuator chamber wall 510 and connected at its distal end 512 to a piston 514. Piston 514 is positioned in a piston chamber 516 so that when the piston is at mid-point of its stroke, the piston chamber 516 is divided approximately into two equal sub-chambers 518 and 520. Sub-chambers 518 and 520 contain a plurality of ports 522 and 524 respectively. The ports 522 and 524 are arranged mostly symmetrically on each side of piston 514 and around its circumference making the signal produced monopolar in nature. Each sub-chamber 518 and 520 can incorporate any number of ports 522 and 524. Most preferably, the areas of the ports should nearly equal the surface area of the piston 514.

In operation of transmitter 500, the transmitter is combined with a monopole receiver in order to measure compressional and shear-wave velocity. Electronic circuitry in the tool, controlled by the operator, determines the pulse shape and rate of the transmitted pulses. Only when formation velocity is greater than borehole fluid velocity is a refracted wave induced in the formation by the transmitted pulse. The refracted wave contains both shear and compressional wave velocity information. When operated in a borehole, the received signals are collected and transmitted up-hole. These signals are then processed to determine shear and compressional wave velocities in the surrounding formation. As the tool moves through the length of the borehole, a log of shear and compressional wave velocities verses depth is formed.

Figure 6:
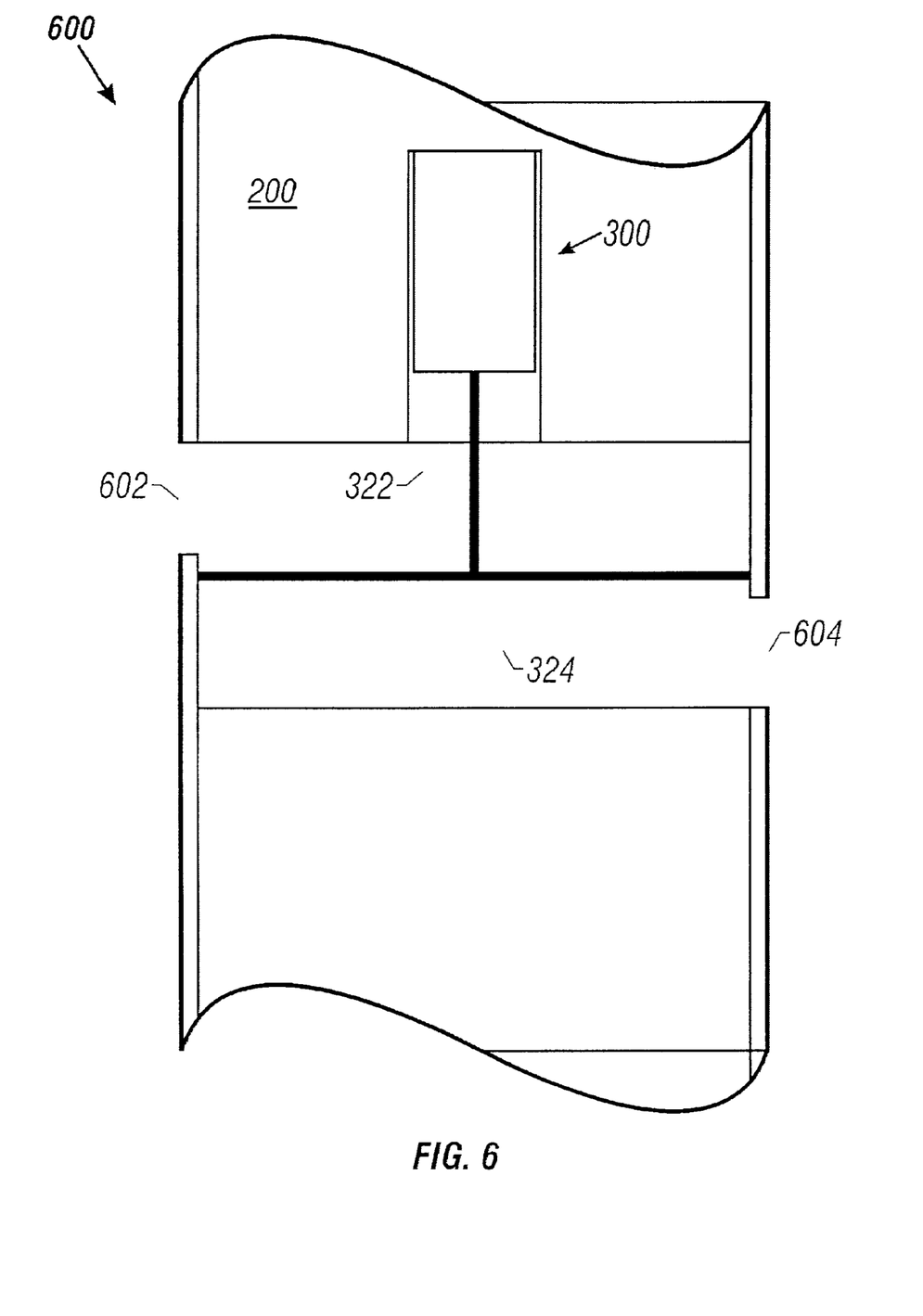
FIG. 6 is a cross-sectional view through a first embodiment of a dipole transmitter 600 of the present invention.

Referring now to FIG. 6, an expanded view 600 of the dipole transmitter 300 of FIG. 3 is shown in a preferred orientation within the tool 200. Tool 200 includes a left transmission port 602 associated with the left port 322 of the transmitter 300 and a right transmission port 604 associated with the right port 324 of the transmitter 300.

EXAMPLES

The following examples are provided merely to illustrate the present invention, and are not intended to and do not limit the claims of the invention.

Example 1

This example illustrates comparative studies of a conventional dipole acoustic transmitter and a dipole acoustic transmitter of the present invention.

A prototype dipole transmitter in accordance with FIG. 3 was built using a Terfenol-D actuator. The prototype transmitter was attached to an existing Low Frequency Dipole Tool (LFDT). Shown in FIGS. 7 through 12 are results of measurements taken from a conventional LFDT transmitter as manufactured by Halliburton Energy Services, Inc. and the new transmitter. Each figure also depicts the placement of a hydrophone relative to the active transmitter. Measurements were taken with the hydrophone placed inside the fluid filled cavity of the transmitter.

Figure 7:
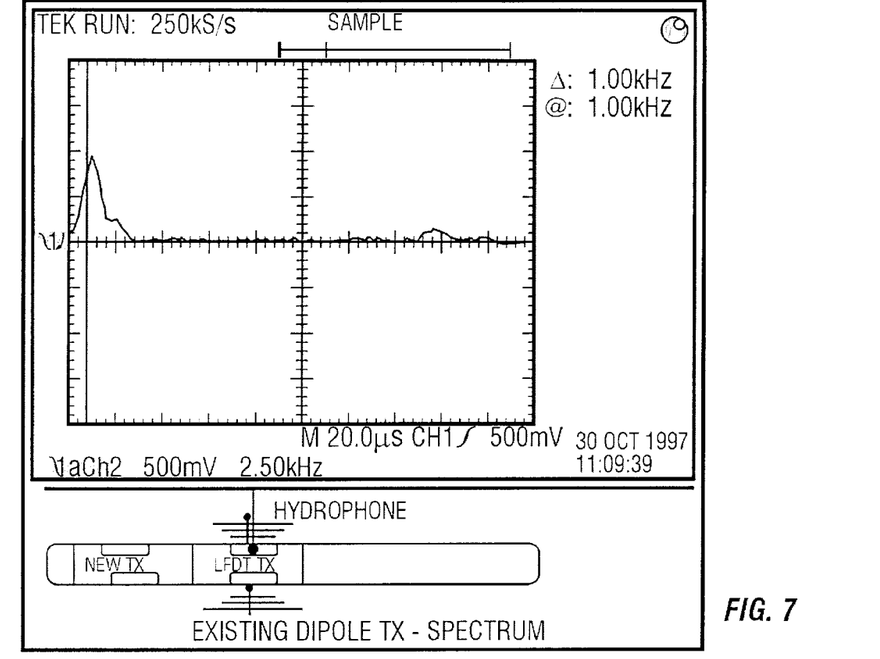
FIGS. 7 and 8 compare the magnitude spectra of an existing dipole transmitter and the new dipole transmitter of FIG. 3.
Figure 8:
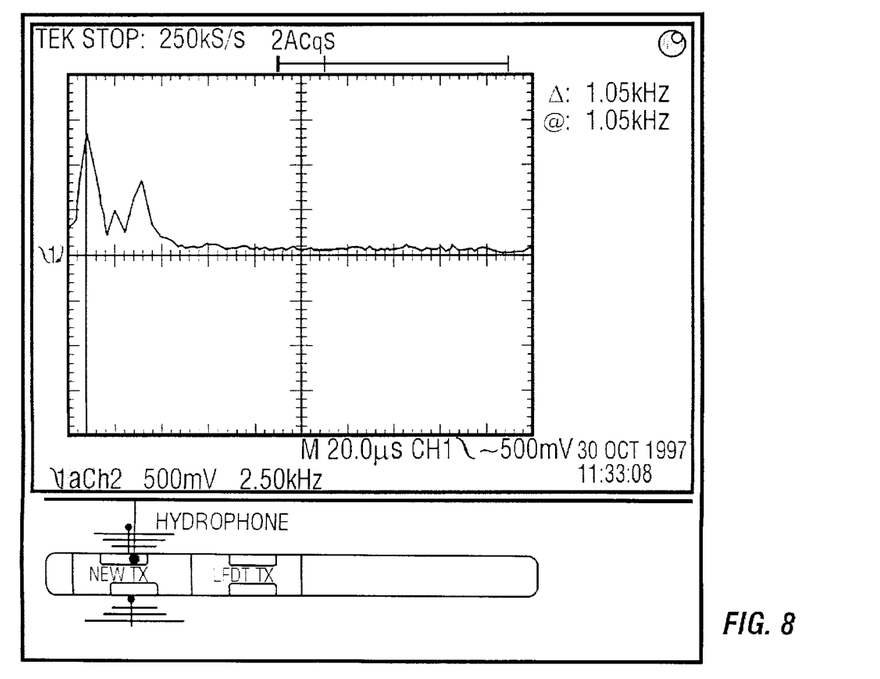
Figure 9:
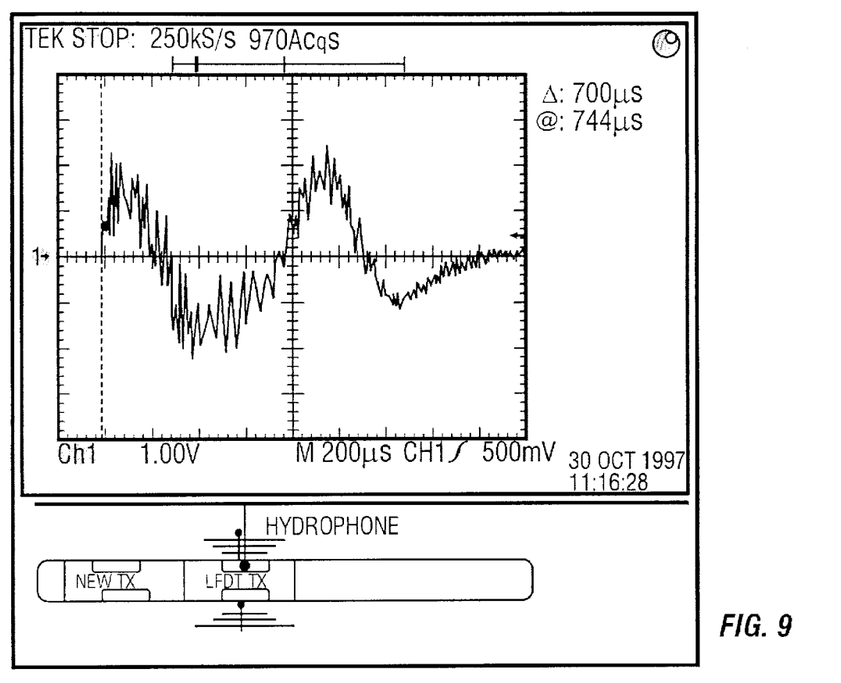
FIGS. 9 and 10 compare the time plots of an existing dipole transmitter and the new dipole transmitter of FIG. 3 depicting performance similarities.
Figure 10:
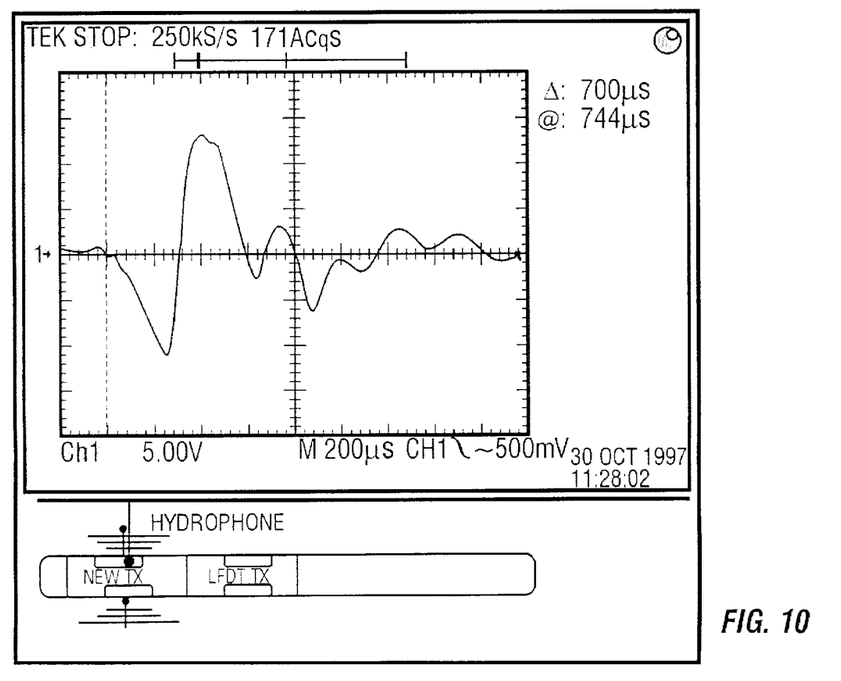

Analysis of the signal spectra shown for the conventional transmitter in FIG. 7 and the prototype transmitter in FIG. 8, and timing plots of the conventional transmitter in FIG. 9 and the prototype transmitter in FIG. 10, suggest that the two transmitters have similar performance characteristics. However, the existing LFDT pulse circuitry used to power the prototype transmitter was mismatched electrically. With proper electrical drive circuitry, the transmitters of this invention will perform significantly better than the performance of the prototype. Even under the mismatched conditions, the pressure amplitudes of the two transmitters are about equal. Normally, the new transmitter would not be driven by this. pulse circuitry, since the pulse circuitry lacks the ability to control the waveform shape. Using a power amplifier, the waveform shape of the pressure waves created by the transmitters of the present invention will be controllable. The waveform is then controlled by a reference signal driven into the power amplifier.

Figure 11:
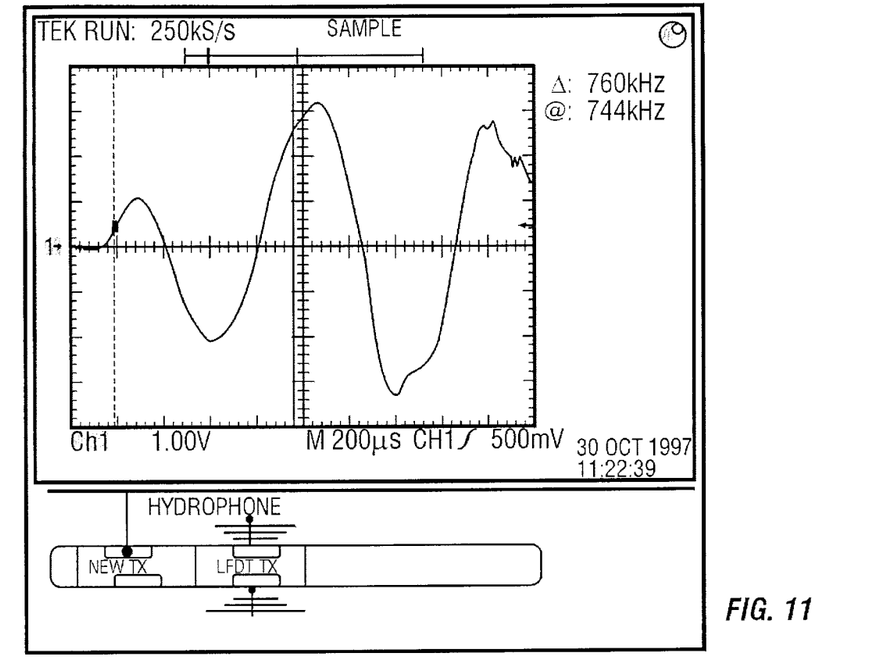
FIGS. 11 and 12 compare the time plots of an existing dipole transmitter and the new dipole transmitter of FIG. 3 depicting reduced tool noise in the new dipole transmitter.
Figure 12:
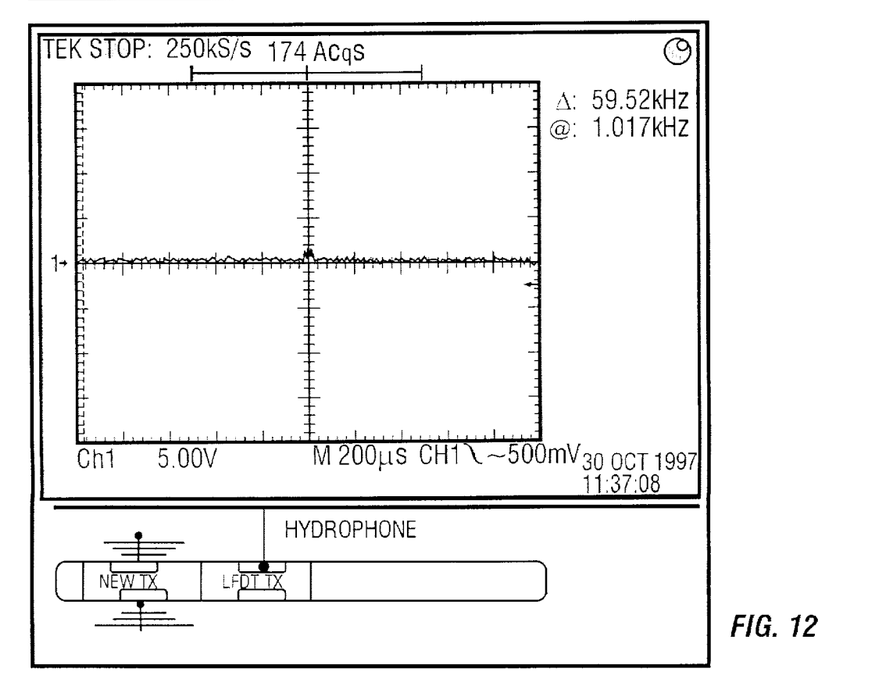

The timing plots shown FIGS. 11 and 12 for the conventional transmitter and the prototype transmitter of the present invention, respectively, indicate that the tool mode noise is substantially reduced with the prototype transmitter relative to the conventional transmitter. Reduced spawned noise from the transmitter will result in improved log interpretation and signal analysis.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

We claim:

1. An acoustic transmitter for use in a well bore comprising:
   (a) a housing having a longitudinal axis defining at least one piston chamber having at least one discharge port, wherein the discharge port is oriented to discharge acoustic energy away from the tool in a discharge direction transverse to the longitudinal axis; and
   (b) a piston positioned in the at least one piston chamber, and slidable parallel to the longitudinal axis.

2. The transmitter of claim 1, comprising at least two discharge ports wherein the ports are oriented anti-symmetrically about the longitudinal axis.

3. The transmitter of claim 1, comprising at least two discharge ports wherein the ports are orientated, symmetrically about the longitudinal axis.

4. The transmitter of claim 1 further comprising an actuator chamber adjacent to the piston chamber, wherein the actuator chamber is filled with a fluid and pressure balanced.

5. The transmitter of claim 4 wherein the fluid is selected from a group consisting of synthetic oils, mineral oils, motor oils, silicones fluids, non-two phase mixtures thereof and combinations thereof.

6. The transmitter of claim 1 wherein the piston defines a passageway for through wires.

7. A tool for use in a bore hole comprising bore hole fluid, the tool comprising:
   (a) a tool body having a longitudinal axis;
   (b) an acoustic wave transmitter supported on the tool body, the transmitter comprising:
      (i) a housing defining at least one piston chamber having at least one discharge port, wherein the discharge port is oriented to discharge acoustic energy away from the tool in a discharge direction transverse to the longitudinal axis;
      (ii) a piston positioned in the at least one piston chamber, and slidable parallel to the longitudinal axis;
   (c) at least one receiver supported by the body.

8. The tool of claim 7, comprising at least two discharge ports wherein the ports are oriented anti-symmetrically about the longitudinal axis.

9. The tool of claim 7, comprising at least two discharge ports wherein the ports are orientated symmetrically about the longitudinal axis.

10. The tool of claim 7, further comprising an actuator chamber adjacent to the piston chamber, wherein the actuator chamber is filled with a fluid and pressure balanced.

11. The tool of claim 10, wherein the fluid is selected from a group consisting of synthetic oils, mineral oils, motor oils, silicones fluids, non-two phase mixtures thereof and combinations thereof.

12. The tool of claim 7 wherein the at least one receiver is located outside of the borehole.

13. The tool of claim 7 wherein the transmitter is electronically controlled to enhance any of processing, pulse shape or the spectral content.

14. The transmitter of claim 7 wherein the piston defines a passageway for through wires.

15. A method of transmitting an acoustic wave into a well bore, having a longitudinal axis, with a piston positioned within the well bore, the method comprising:
   (a) moving the piston in a direction parallel with the longitudinal axis to produce an acoustic wave in a discharge direction transverse to the longitudinal axis.

16. The method of claim 15, wherein the acoustic wave is discharged through at least two ports defined by a housing having a longitudinal axis defining at least one piston chamber, and wherein the ports are oriented anti-symmetrically about the longitudinal axis.

17. The method of claim 15, wherein the acoustic wave is discharged through at least two ports defined by a housing having a longitudinal axis defining at least one piston chamber, and wherein the ports are oriented symmetrically about the longitudinal axis.

18. The method of claim 15, wherein the piston is housed in a fluid filled and pressure balanced chamber.

19. A method of recording acoustic waves in a well bore, having a longitudinal axis with a piston and receiver positioned within the well bore, the method comprising:
   (a) moving the piston in a direction parallel with the longitudinal axis to discharge acoustic energy into the well bore in a discharge direction transverse to the longitudinal axis;
   (b) recording the acoustic waves generated by the piston.

20. The method of claim 19, wherein the acoustic wave is discharged through at least two ports defined by a housing having a longitudinal axis defining at least one piston chamber, and wherein the ports are oriented anti-symmetrically about the longitudinal axis.

21. The method of claim 19, wherein the acoustic wave is discharged through at least two ports defined by a housing having a longitudinal axis defining at least one piston chamber, and wherein the ports are oriented symmetrically about the longitudinal axis.

22. The method of claim 19, wherein the piston is housed in a fluid filled and pressure balanced chamber.

* * * * *